United States Patent [19]
Nishino

[11] Patent Number: 5,623,583
[45] Date of Patent: Apr. 22, 1997

[54] THREE-DIMENSIONAL MODEL CROSS-SECTION INSTRUCTION SYSTEM

[75] Inventor: Sekiji Nishino, Kawasaki, Japan

[73] Assignee: Fujitsu Limited, Kawasaki, Japan

[21] Appl. No.: 404,618

[22] Filed: Mar. 15, 1995

[30]  Foreign Application Priority Data

Mar. 16, 1994 [JP] Japan .................................. 6-046120

[51] Int. Cl.⁶ .................................................. G06F 15/00
[52] U.S. Cl. ............................................................. 395/120
[58] Field of Search ...................................... 395/119, 120, 395/141, 155, 161; 345/113, 118

[56]  References Cited

U.S. PATENT DOCUMENTS 5,454,371  10/1995  Fenster et al. ...................... 128/660.07

FOREIGN PATENT DOCUMENTS 3-185578  8/1991  Japan .

*Primary Examiner*—Phu K. Nguyen
*Attorney, Agent, or Firm*—Staas & Halsey

[57]  ABSTRACT

In a computer system that has a graphic display, an external memory device, and a mouse, this system comprises a figure data read-in processing unit that reads in three-dimensional figure data stored in the external memory device into the system and stores the data; a mouse control unit that specifies an arbitrary cross-section and moves and rotates the three-dimensional figure using a mouse; a cross-section shape processing unit that computes the cross-section shape figure data for the three-dimensional figure based on the cross-section specification by the mouse control unit; a figure data editing unit that judges which parts of the three-dimensional figure including the cross-section are not to be displayed and edits the figure data; and a graphic control unit that displays the figure data on a graphic display,

13 Claims, 13 Drawing Sheets

FIG. 1
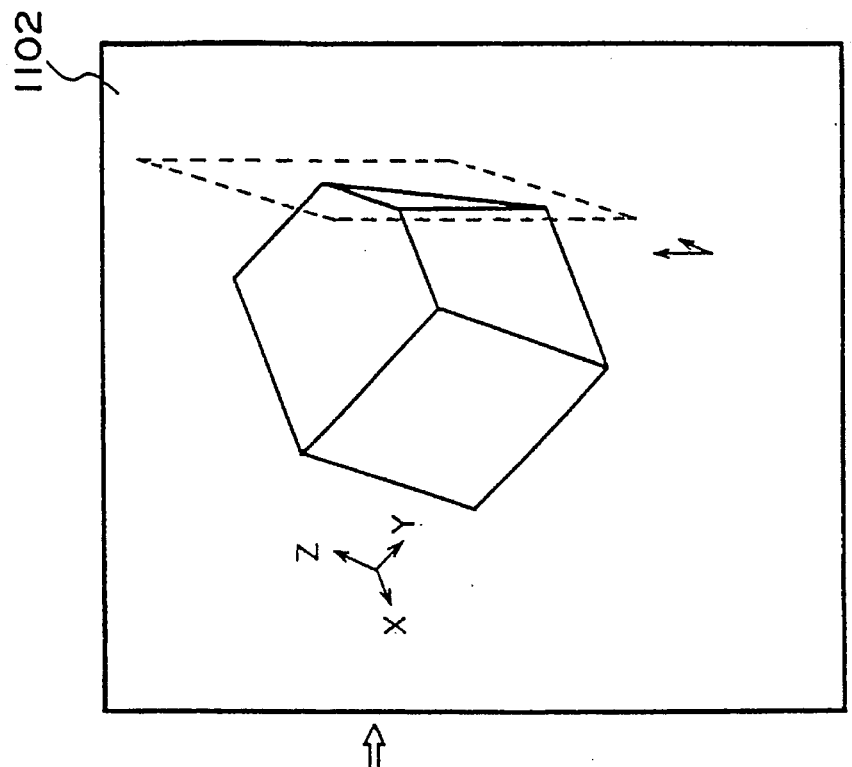
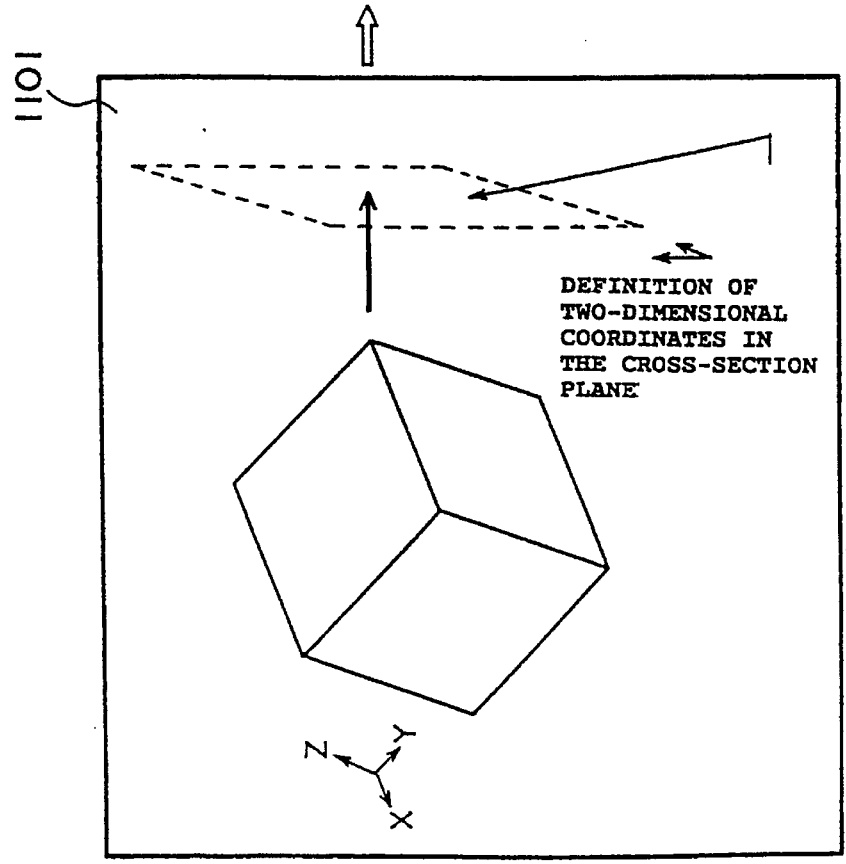
DEFINITION OF
TWO-DIMENSIONAL
COORDINATES IN
THE CROSS-SECTION
PLANE

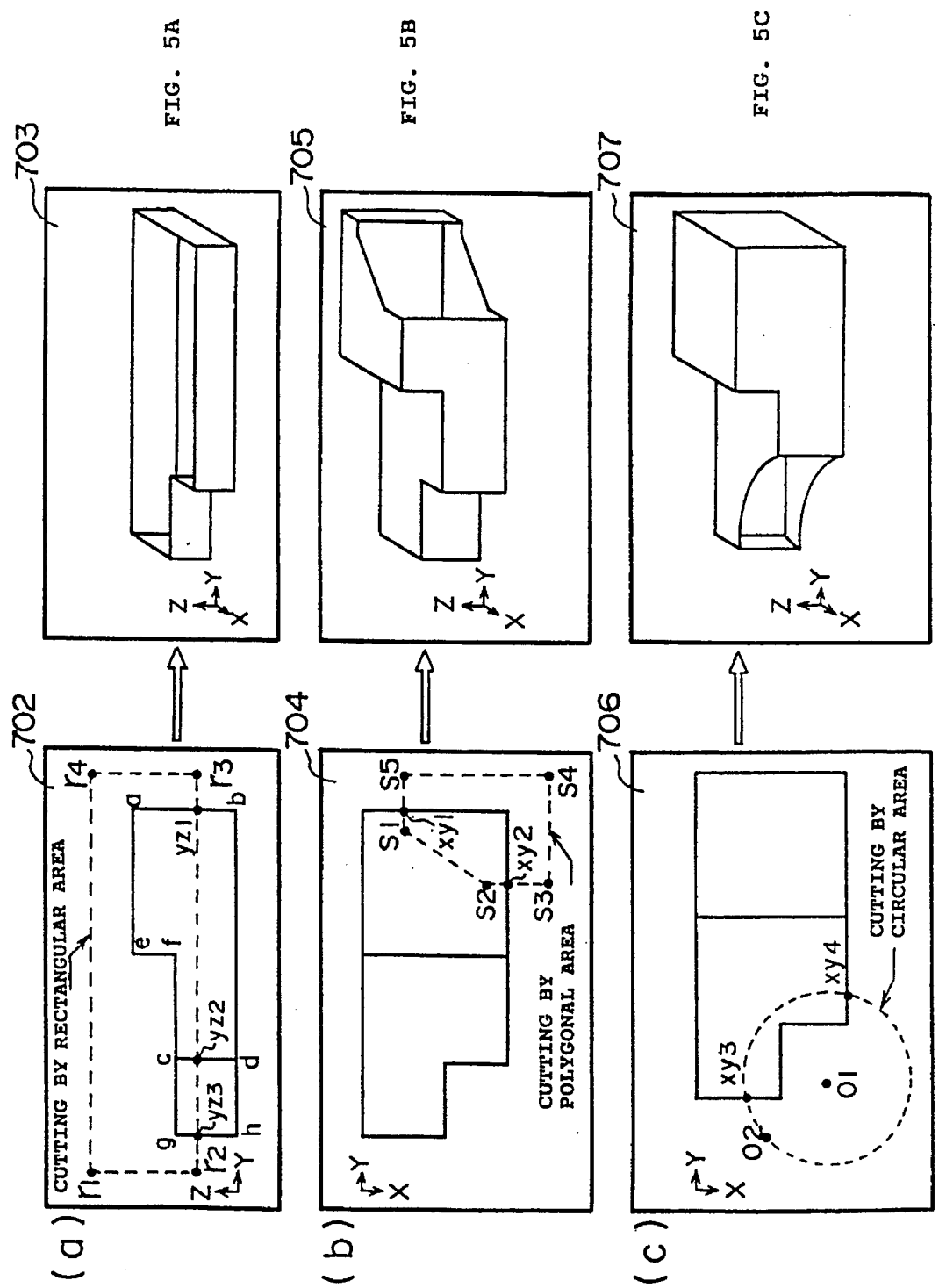

| EDGE IDENTIFICATION NUMBER | COORDINATES | COORDINATES | - - - |
|---|---|---|---|
| (1) | ⑨ | ② | |
| (2) | ② | ③ | |
| (3) | ③ | ④ | |
| (4) | ④ | ⑤ | |
| (5) | ⑤ | ⑥ | |
| (6) | ⑥ | ⑦ | |
| (7) | ⑦ | ⑧ | |
| (8) | ⑧ | ⑨ | |

FIG. 13A

| (1) | ① | ⑨ | ② | - - - |
|---|---|---|---|---|
| (7) | ⑦ | ⑧ | ① | - - - |

FIG. 13B

THREE-DIMENSIONAL MODEL CROSS-SECTION INSTRUCTION SYSTEM

BACKGROUND OF THE INVENTION

1. Field of the Invention

This invention relates to a three-dimensional model cross-section instruction system and instruction method. More specifically, it is related to a three-dimensional model cross-section instruction system and instruction method that make it easy to specify the cross-section to be displayed and display the cross-section effectively when viewing the conditions inside a three-dimensional structure.

2. Description of the Related Arts

In recent years, technological progress in workstations has made it possible to process three-dimensional model data rapidly.

When viewing a part located in the interior of a large-scale three-dimensional structure such as one apparatus, a test product is assembled at the actual work site and, if a problem occurs, the apparatus must be disassembled to remove the part causing the trouble. However, if simulated model data are created on a computer, it is then possible to display an interior part causing trouble on the screen while assembling the parts on the screen, and it becomes easy to grasp the location of that part.

For these reasons, when creating a three-dimensional model of an apparatus comprising a number of parts and units it is convenient to be able to display cross-sections. When displaying a cross-section, it is necessary for the user to specify the cross-section to be displayed.

FIG. 1 is a diagram that explains the previous method of specifying a cross-section.

First, for example a three-dimensional model of a three-dimensional object is displayed on the display screen 1101; let us suppose that the user wishes to display a cross-section of this three-dimensional model. In this case, the user first defines a two-dimensional coordinate system on the cutaway surface separate from the coordinate system of the three-dimensional figure (X, Y, Z in the diagram). Then the three-dimensional model is moved toward that cutaway surface. As a result, the shape 1102, which is the part that crosses that cutaway surface, is displayed on the display. That is to say, the figure of the cross-section is displayed by not displaying the part that crosses the cutaway surface of the three-dimensional model (clipping processing). This method is described in, for example, Japanese Patent publication hei3-185578.

Meanwhile, improvement of the method of displaying the cutaway surface has moved ahead of the method of specifying the cutaway surface. For example, display processing such as coloring display, hidden surface display, shadow display, etc. have been quite effective in creating three-dimensional models of individual parts.

In this method, by means of hidden display the figures located in the interior are hidden when the parts are assembled. Therefore, to display the interior the transparency of parts located on the outside is specified and external parts are displayed as translucent. This method is described in, for example, Japan Patent publication hei4-71082.

However, the prior methods each have their own respective problems.

Specifically, the cutaway section in clipping processing is a display method that is used in, for example, defining the virtual limit of display on the display screen; simple rotation of the cutaway surface is possible, but the cutaway surface cannot be given an arbitrary shape, and partial cutting of a section cannot be specified. This creates the problem that, in a three-dimensional model with complicated nesting, such as parts within parts that are in the interior of the apparatus, the inside parts cannot be displayed effectively.

In translucent display processing, the shapes and positions of interior parts can be grasped, but there is the problem that if a correction is to be applied to one part in the interior, since the display is (transparent only translucent) the accurate coloring and shadow pattern of that part are lost. In addition, in translucent display processing, there is the problem that various data conversion calculations must constantly be done for a huge amount of three-dimensional figure data using the transmissivity, making the calculations expensive.

Moreover, whichever method is used, whenever a figure is displayed all figure data must be read in, regardless of whether they will be displayed or not, so that the quantity of data which must be handled is large and considerable time is required for the processing.

When corrections are to be applied to parts in the interior of a model made by assembling a number of parts, and the positions of those parts are to be checked, it is necessary to be able to display cross-sections easily and in a short time, without affecting the condition or position information of parts other than the ones to be corrected.

SUMMARY OF THE INVENTION

An object of this invention is to make it possible to specify a cross-section to be displayed in three-dimensional model display processing easily, for an arbitrary shape and at an arbitrary location that is convenient in given working conditions.

This invention assumes a graphic display system for three-dimensional figure data in an X, Y, Z coordinate system which has a CPU, external memory device, mouse and graphic display.

In the display system, there are a figure data read-in processing unit which reads in and stores three-dimensional figure data stored in an external memory device; a graphic control unit which displays three-dimensional figure data stored in the figure data read-in processing unit on the graphic display; a mouse control unit, which permits the user to specify an arbitrary cross-section and arbitrary rotation and translatory movement for the three-dimensional figure data displayed on the graphic display using the mouse, and then creates the corresponding specification information; a cross-section shape processing unit, which computes the geometrical shape of the specified cross-sectional surface; and a figure data editing unit, which distinguishes the three-dimensional figure data to be displayed from the part of the three-dimensional figure data that is to be removed from the display by the cutting. This system specifies and displays the cross-section of a figure in the interior of a three-dimensional structure that is to be displayed.

Three-dimensional figure data stored in an external memory device are displayed on the graphic display as a three-dimensional structure by the graphic control unit through the figure data read-in processing unit.

The cross-section is specified on the graphic display using the mouse. The user specifies the cutaway surface to be cut open from the three-dimensional structure being displayed by specifying, for example, points on the display with the mouse.

For example, a cutaway surface can be specified on a figure that is a projection of a three-dimensional structure onto a plane. In this method, in the case in which the cutaway surface is a polygon, the vertices of the polygon would be specified; if the cross-section is a circle, the center of the circle and one point on the circumference would be specified. If the cutaway surface is a square, it is sufficient to specify two points on a diagonal.

Suppose for example that a cross-section is to be specified using three-dimensional coordinates defined for the three-dimensional structure. In this case, at least one plane perpendicular to one of the three coordinate axes is specified as the cutaway surface, then this surface is moved to the location in the three-dimensional structure where the actual cut is to be made and the cutaway surface specified at the desired position.

The figure of one side of the cut specified as described above is displayed while the other side of the cut is not displayed. It is sufficient for the decision as to which side of the cut is to be displayed to be made automatically by the system; or the user can make this decision, for example using a mouse.

A cut to be made in a three-dimensional structure can, for example, be specified to be at a location where it overlaps another three-dimensional structure. Another three-dimensional structure, for example, can be dragged across the graphic display by a mouse. In this case, the user can easily move the three-dimensional structure being dragged at will and superimpose it on the three-dimensional structure in which the cut is to be made so that the desired cutaway surface is obtained. In this case, it is also possible to move the three-dimensional structure in which the cut is to be made.

Information that specifies the cross-section created by the user manipulating a mouse is sent to the cross-section shape processing unit, and the specified cross-section and the shape of the cross-section of the three-dimensional structure are calculated. Three-dimensional figure data including the shape of the cross-section are created based on the results of this calculation. Three-dimensional figure data including the cross-section shape are sent to the figure data editing unit, judgments are made as to which of the data are to be displayed, and information as to whether or not they are to be displayed in the figure data is written. After these figure data are sent to the memory of the figure data read-in processing unit, they are displayed on the graphic display by the graphic control unit, and the user obtains an image of the three-dimensional structure cut into the desired shape.

In addition, when the graphic control unit displays the cut-open three-dimensional structure, the figure data that are not to be displayed are not read out of the memory of the figure data read-in processing section, so it is not necessary to process an excessive amount of figure data, thus speeding up the figure data processing.

Other characteristics and advantages of this invention will be adequately understood from the following explanation.

BRIEF DESCRIPTION OF THE DRAWINGS

FIG. 1 is a diagram explaining a previous method of specifying a cross-section.

FIGS. 5A–5C are illustrating the first method of specifying a cross-section of the embodiment according to this invention.

FIGS. 13A and 13B are schematic diagram of figure data to explain the operation of the graphic control unit.

DESCRIPTION OF THE PREFERRED EMBODIMENT

Figure 2:
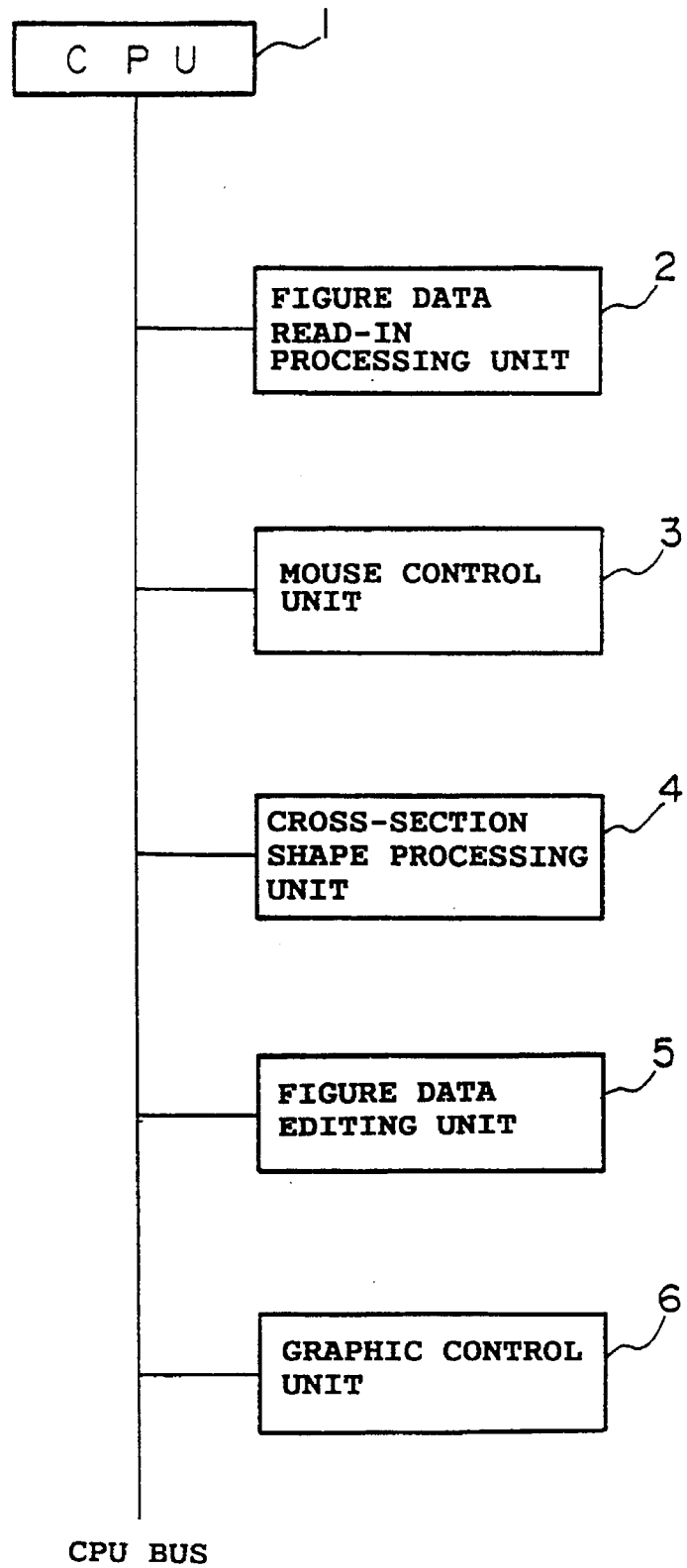
FIG. 2 is a block diagram of this invention.

A functional block diagram of this invention is shown in FIG. 2. This invention assumes a computer system comprising the CPU1 as a main element, a graphic display, external memory device and mouse, and the bus of CPU1.

First, the figure data read-in processing unit 2 is connected to the CPU1 bus. The figure data read-in processing unit 2 reads in the three-dimensional figure data stored in the external memory device, and stores them in the internal memory.

Next, the mouse control unit 3 is connected to the CPU1 bus. The user uses the mouse to move and rotate the three-dimensional figure, or to specify the cutaway surface of the three-dimensional figure. The mouse control unit 3 detects movement of the mouse cursor and the clicking operation of the mouse button, and creates mouse cursor movement data and click information.

In addition, the cross-section shape processing unit 4 is connected to the bus of CPU1. The cross-section shape processing unit 4 computes the cross-section shape from the three-dimensional figure data stored in the figure data read-in processing unit 2 and the information created by the mouse control unit for the cross-section specified by the user using the mouse; creates figure data for the three-dimensional figure including the cross-section shape; and sends them to the memory of the figure data read-in processing unit In addition, the figure data editing unit 5 is connected to the bus of CPU1. The figure data editing unit 5 judges whether or not to display the respective figure data created by the cross-section shape processing unit 4, adds data a specifying whether or not to display the data to the figure data, and sends them to the memory of the figure data read-in processing unit 2.

Finally, the graphic control unit 6 is connected to the bus of CPU1. The graphic control unit 6 reads in the figure data stored in the graphic data read-in processing unit 2, and performs the processing necessary for display on the graphic display. At this time, if an instruction to move or rotate the three-dimensional figure on the graphic display is received from the mouse control unit 3, the movement or rotation coordinate conversion processing is applied to the figure data, and display data are created for the graphic display. In addition, three-dimensional figure surface coloring and hidden surface processing are performed. In the above configuration of this invention, the information concerning the figure data and the mouse is sent to each of the units through the CPU bus. The CPU1 receives and sends the data, and applies control such as starting to each of the processing units.

Next, let us explain the action in the block diagram shown in FIG. 2.

First, processing to read the three-dimensional figure data that are the object of the processing into the system is performed. Specifically, the CPU1 starts the figure data read-in processing section 2; then the three-dimensional figure data stored in the external memory device are read in, and stored in memory. At this time, a list of three-dimensional figures stored in the external memory device is displayed, for example in the form of a menu, so that the user can select the three-dimensional model to be the object of the processing.

When the three-dimensional figure data that are to be the object of the processing are stored in the memory in the figure data read-in processing unit 2, the CPU1 then starts the graphic control unit 6. The graphic control unit 6 receives the figure data from the memory in the figure data read-in processing unit 2, and displays them on the graphic display screen. Then surface coloring and hidden surface processing are performed in accordance with the figure data.

When the three-dimensional figure that is to be the object of processing is displayed on the graphic display, the user gives instructions for the movement and/or rotation of the three-dimensional figure to make it easy to see. The user gives the movement and rotation instructions with the mouse. The mouse control unit 3 detects the mouse action indicating movement and rotation, and creates movement and rotation information. The CPU1 sends this information to the graphic control unit 6. The graphic control unit 6 performs coordinate conversion in accordance with the received movement and rotation information and displays the result on the graphic display.

Next, processing to permit the user to specify the cross-section surface is performed. The CPU1 offers several methods of specifying the cross-section; the user can select one of them. For example, there are the method of projecting the three-dimensional figure that is the object of processing onto two-dimensional coordinates and then specifying the cut area on the two-dimensional coordinates (the first method); the method of specifying an arbitrary surface for the three-dimensional figure that is the object of processing (the second method); and the method of specifying another three-dimensional figure in addition to the three-dimensional figure that is the object of processing, then moving and/or rotating one of the three-dimensional figures and specifying the cut area (the third method).

When the user selects one of the methods of specifying the cross-section, the CPU1 performs the specifying process in accordance with the selected cutting specifying method.

For example, if the first method is selected, the user is asked to select the two-dimensional coordinates onto which the three-dimensional figure that is the object of processing is to be projected. This information is sent to the graphic control unit 6; the graphic control unit 6 displays the figure resulting from the movement and rotation of the figure data and their projection onto the two-dimensional coordinates on the graphic display. Next, the CPU1 asks the user to specify the cut area. For example, suppose that a rectangular, polygonal or circular cut area is specified. If a rectangle, the upper left and lower right corner coordinates; if a polygon, the coordinates of all of the vertices; if a circle, the coordinates of the center and one point on the circumference are input using the mouse cursor. The mouse control unit 3 creates cut area shape and coordinate data. Also, the graphic control unit 6 displays the cut area on the graphic display.

If the second method is selected, the user specifies the cross-sectional surface with the mouse, and the mouse control unit 3 creates the coordinate data information for that cross-section. The graphic control unit 6 then receives the cross-section surface coordinate data created by the mouse control unit 3, and displays them on the graphic display. At this time, the user again uses the mouse to move this cutaway surface. The mouse control unit 3 detects this movement, and updates the cutaway surface coordinate data.

If the third method is selected, the CPU1 starts the figure data read-in processing unit 2, then requests the user to select one more three-dimensional figure and stores the three-dimensional figure data in the memory of the figure data read-in processing unit 2. Then the graphic control unit 6 is started, and the second three-dimensional figure is also displayed on the graphic display. The user then uses the mouse to move the two three-dimensional figures into the desired positional relationship. The mouse control unit 3 detects the mouse cursor movement, and creates coordinate data for the positional relationship of the two three-dimensional figures. The graphic control unit 6 receives these data and displays the two three-dimensional figures on the graphic display.

When the user completes the cross-section specification, next the CPU1 starts the cross-section shape processing unit 4.

The cross-section shape processing unit 4 reads in the three-dimensional shape data from the memory of the figure data read-in processing unit 2; then receives coordinate data related to the cutaway surface from the mouse control unit 3. From these data, the cross-section shape processing unit 4 computes the cross-section shape.

If, for example, the first cross-section selection method is selected, the cross-section intersection line on the two-dimensional coordinates is found by finding the intersection point of the cut area on the two-dimensional coordinates and the three-dimensional figure projected onto the two-dimensional coordinates, then this is projected onto the three-dimensional coordinates to find the cross-sectional surface on the three-dimensional coordinates.

If the second cross-section specification method is selected, the intersection point between the original three-dimensional figure and the two-dimensional cross-section is found, and then the intersection line is found to compute the cross-section shape.

If the third cross-section specification method is selected, the position data of the two three-dimensional figures are selected, and the intersection line on which the two three-dimensional figures coincide is found to find the cross-section surface.

The intersection line between the three-dimensional shape and the cutaway area and the cross-sectional surface are found as explained above. The cutaway area intersection line and cross-section data that are found are stored in the memory in the figure data read-in processing unit 2 as structural figure data similar to the three-dimensional figure data.

Next, the CPU1 starts the figure data editing unit 5. The figure data editing unit 5 reads in the figure data from the memory in the figure data read-in processing unit 2. Then, for each set of figure data, it is judged whether the figure data are inside or outside the cutaway area; it is determined whether the data are to be displayed or not displayed according to whether they are inside or outside; the figure data are divided into those that are to be displayed and those that are not to be displayed, and then they are stored in the memory in the figure data read-in processing unit 2. Whether the inside data are to be displayed, that is, whether the outside data are to be not displayed or displayed, can be decided automatically by the system, or the user can be allowed to select one of the options.

Finally, the CPU1 starts the graphic control unit 6 and displays the three-dimensional figure including the cross-section on the graphic display. The graphic control unit 6 reads in the data among the figure data that are set to be displayed from the memory in the figure data read-in processing unit 2. Then the processing to display the data on the graphic display is performed.

By means of the above processing, the user can easily specify the cross-section surface using the mouse.

Figure 3:
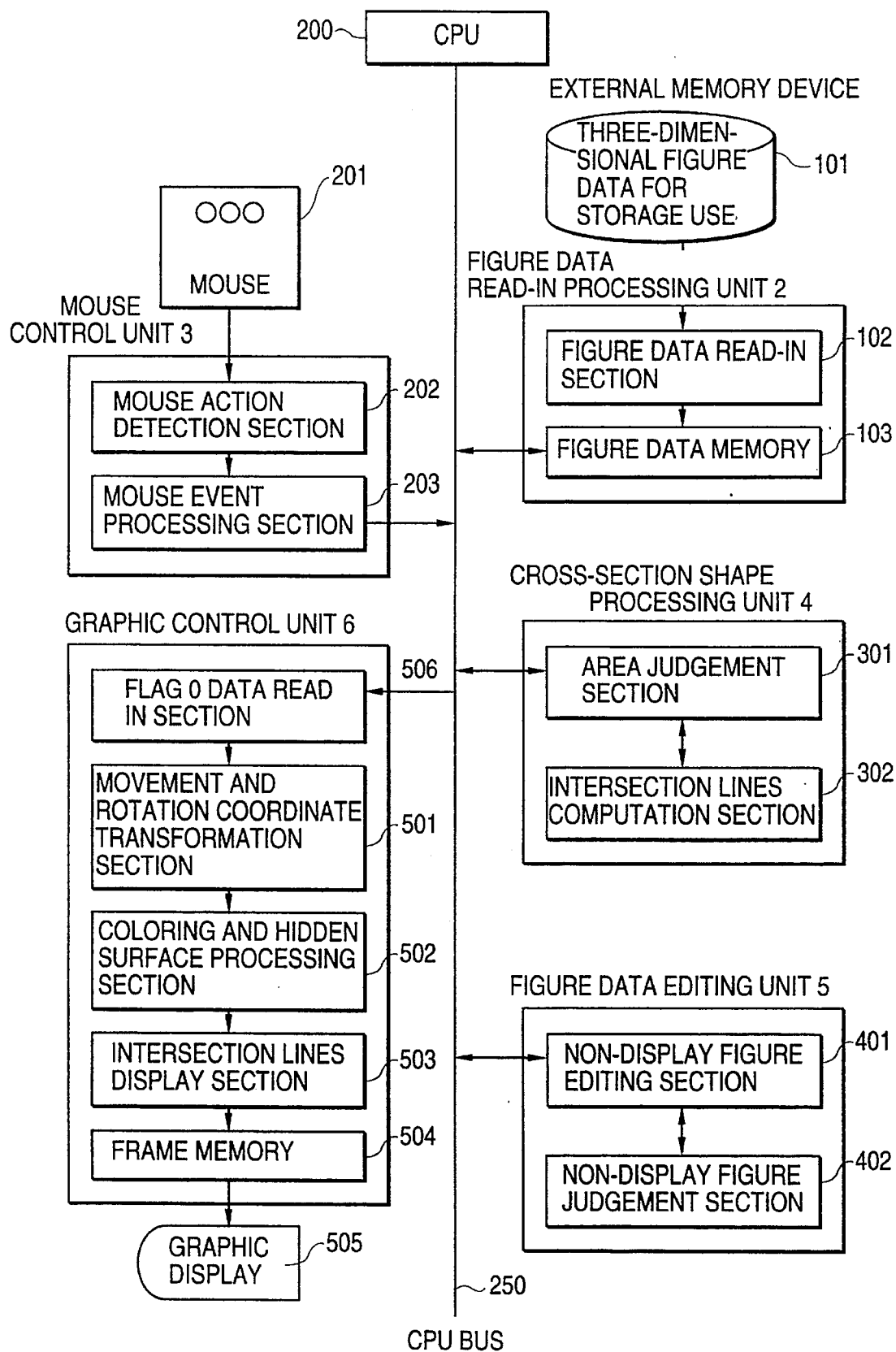
FIG. 3 is a system configuration diagram of one embodiment according to this invention.

FIG. 3 is a system configuration diagram of one embodiment of this invention.

This embodiment is constructed on, for example, a computer system that has an external memory device such as a hard disc unit, a graphic display and a mouse. The computer system comprises the CPU 200 as a main element; the CPU 200 has a CPU bus 250 to which the various processing units are connected. First, the mouse control unit 3 which detects motion of the mouse 201, the graphic control unit 6 which controls the display on the graphic display and the figure data read-in processing unit 2, which reads in three-dimensional figure data from the external memory device 101, are connected to the CPU bus 250. In addition, the cross-section shape processing unit 4, which performs calculation processing for the cross-sectional shape and is the heart of this invention, and the figure data editing unit 5, which performs figure data editing for display of the cross-section shape, are connected to the CPU bus 250. Then the CPU 200 controls those various processing units, and performs the processing to compute and display the cross-section shapes.

The figure data read-in processing unit 2 comprises of the figure data read-in unit 102, which reads in three-dimensional figure data accumulated in the external memory device 101, and the figure data memory 103, which stores the figure data that were read in inside the system. The figure data memory 103 can be in the RAM, for example it could be a memory area on the main memory in the computer system.

The mouse 201 is connected to the mouse control unit 3. The user moves and rotates figures, specifies cutaway surfaces, etc. by moving and clicking the mouse. Then the click signals and movement signals from the mouse 201 are input to the mouse control unit 3 through connecting wires. The mouse control unit 3 has a mouse action detection section 202 and a mouse event processing section 203. The mouse action detection section 202 detects click signals and movement signals detects click signals and movement signals from the mouse 201; the mouse event processing section 203 then translates those signals and sends them to the CPU bus as events.

The cross-section shape processing unit 4 computes the cross sections, which is the central operation of this invention. Specifically, the cross-section shape processing unit 4 comprises of an area judgment section 301 and an intersection line computation section 302. When the user specifies a cross-sectional surface, for example with the mouse, the area judgment section 301 computes the cross-section shape from the figure data read out through the CPU bus 250 from the figure data memory 103 in the figure data read-in processing unit 2. In addition, the line intersection computation section 302 computes the coordinates of crossed lines that are intersections of the cross-sectional surface and the figure data. The computed cross-section shape data and the data concerning the intersection line are then again stored in the figure data memory 103 in the figure data read-in processing unit 2. Details of the area judgment section 301 and the line intersection computation section 302 are explained below.

Meanwhile, the figure data editing unit 5 performs editing processing of the figure data created by the cross-section shape processing unit 4. Specifically, the figure data editing unit 5 consists of the non-display figure editing section 401 and the non-display figure judgment section 402. The non-display figure judgment section 402 reads in figure data stored in the figure data memory 103 in the figure data read-in processing unit 1 through the CPU bus 250, and judges whether or not the data for each part of a figure should be displayed. Then the non-display figure editing section 401 performs an editing operation that adds to the figure data additional data to indicate whether or not the figure data are to be displayed, in accordance with the result of judgment by the non-display figure judgment section 402. The figure data that result from this editing are again stored in the figure data memory 103. Details of the figure data editing unit 5 will be explained below.

Finally, the data that have been created are displayed on the graphic display 505 by the graphic control unit 6. The graphic control unit 6 has the function of creating the actual frame data to display the figure data input through the CPU bus 250 on the graphic display screen. The graphic display unit 6 has a flag 0 data read-in section 506, a movement and rotation coordinate conversion section 501, a coloring and hidden surface processing section 502, an intersection line display section 503 and a frame memory 504. The frame memory 504 is a memory that stores enough data to be displayed on the graphic display to fill one screen or several screens. Figures are displayed on the graphic display 505 by sending data accumulated in the frame memory 504 to the graphic display 505.

Figure data are input to the graphic control unit 6 through the CPU bus 250. The flag 0 data read-in section 506 directly accesses the figure data memory 103 and reads in only those data that do not have data indicating that they are not to be displayed (data having flag of 0). The movement and rotation coordinates conversion section 501 performs conversion processing of data to accompany movement and/or rotation when there is an indication from the mouse 201 that the figure is to be moved and/or rotated. The coloring and hidden surface processing section 502 colors the surface of the figure close to the actual coloring, and performs processing where there is to be shading. The intersecting lines display section 503 processes the figure data so that the intersection lines computation section 302 in the cross-section shape processing unit 4, to be explained below, can display the computed intersection line on the figure on the display.

Next, let us explain the action of the system having the composition described above after first explaining the method of specifying the cross-section.

Figure 4:
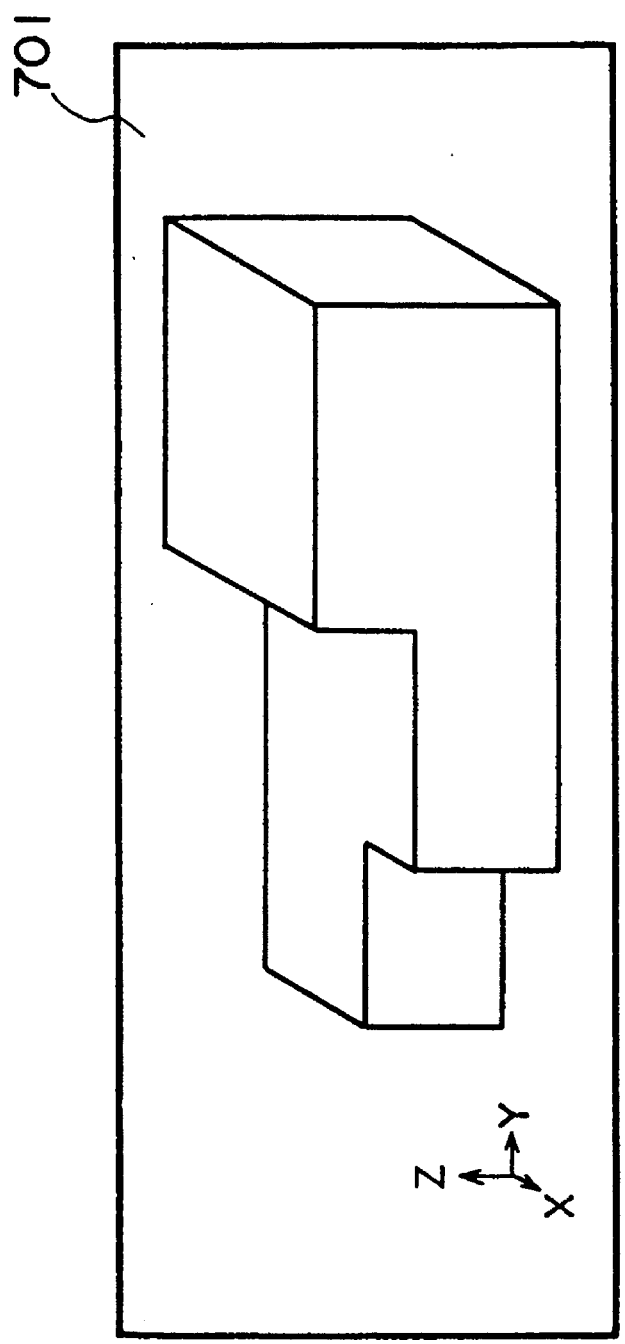
FIG. 4 is an example of display of a three-dimensional figure.

When this system is started, first the three-dimensional figure that is the object of the processing is read in from the external memory device 101 and displayed on the graphic display 505. FIG. 4 shows an example of display of a three-dimensional figure that is the object of processing. For a three-dimensional figure that is the object of processing and is displayed in this manner, the user specifies the cross-section to be displayed using the mouse 201.

Cross-section specification methods can be classified into three types. The user selects one of these methods using the mouse 201.

FIGS. 5A to 5C show examples of the first cross-section specification method.

In the first cross-section specification method, first, the cross-section is specified by such three-dimensional figure as shown in FIG. 4 projecting on a two-dimensional coordinate screen.

The user selects one of the two-dimensional coordinate surfaces X-Y, Y-Z or Z-X using the mouse 201 in the three-dimensional figure, as shown in FIG. 4. By means of this specification, the graphic control unit 6 displays the three-dimensional figure on the specified two-dimensional coordinates. FIG. 5A shows a two-dimensional display on the Y-Z plane, and FIGS. 5B and 5C on the X-Y plane.

The user specifies the cutaway area on this kind of display of the figure on two dimensions with the mouse 201. For example, it is possible to specify the area cut by a rectangle (702 in FIG. 5A), the area cut by a polygon (704 in FIG. 5B) or the area cut by a circle (706 in FIG. 5C).

The kind of cutaway area information described above is received by the cross-section shape processing unit 4, and the cross-section shape and intersection lines are computed.

The figure data editing unit 5 adds data to indicate whether or not cross-section and intersection line data computed by the cross-section shape processing unit 4 are to be displayed, then stores the resulting data set in the figure data memory 103 in the figure data read-in processing unit 2 as figure data. Then, finally, the Graphic control unit 6 reads out the figure data including the cross-section from the figure data memory 103, and displays them on the Graphic display 505.

As shown in FIG. 5A, when a cutaway surface cut by a rectangular area on the Y-Z plane is specified (702), then, as shown by 703 in the same figure, a three-dimensional figure with the upper part of the original three-dimensional FIG. 701 cut away is displayed. When a pentagon on the X-Y plane is cut away, as shown by 704 in FIG. 5B, the three-dimensional FIG. 701 with a cross section cut away in the lower right part, as shown by 705 in the same figure, is displayed. When a circle on the X-Y plane is cut away, as shown by 706 in FIG. 5C, then a three-dimensional figure including a circular arc cross-section cut away from the lower left part of the original three-dimensional FIG. 701, as shown by 707 in the same figure, is displayed.

The above is the first method of specifying a cross-section, by specifying the cutaway area when a three-dimensional shape has been projected onto two-dimensional coordinates.

Figure 6A:
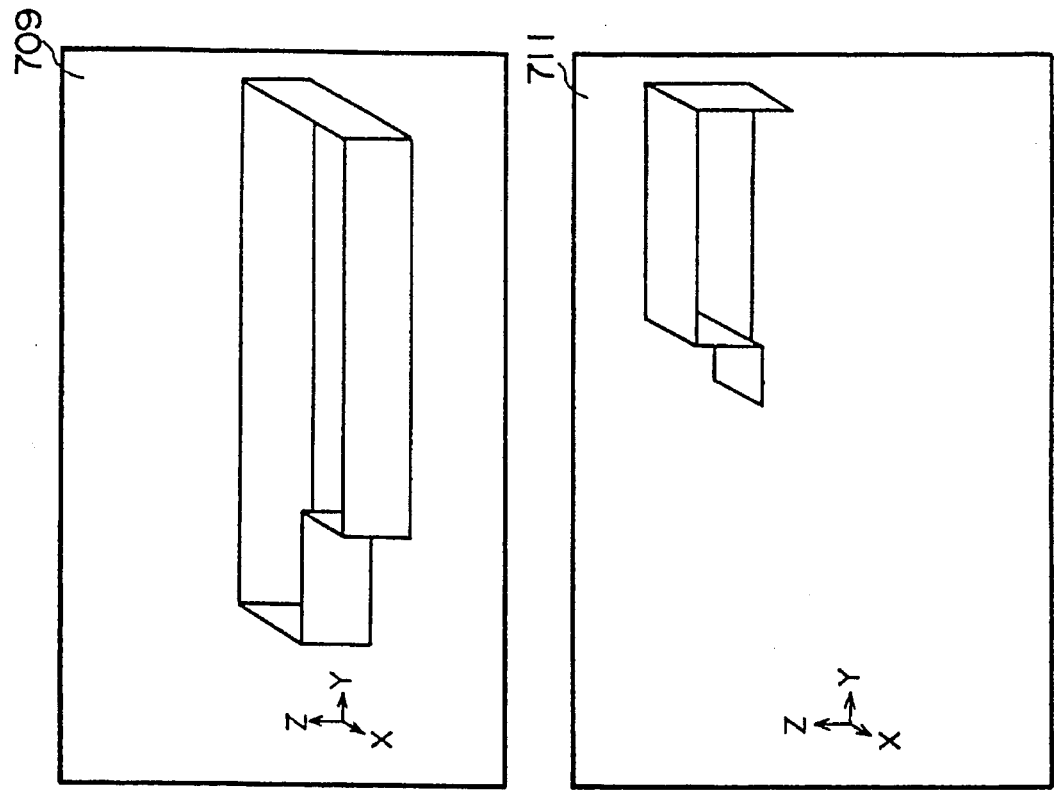
FIGS. 6A and 6B are illustrating the second method of specifying a cross-section of the embodiment according to the present invention.
Figure 6B:
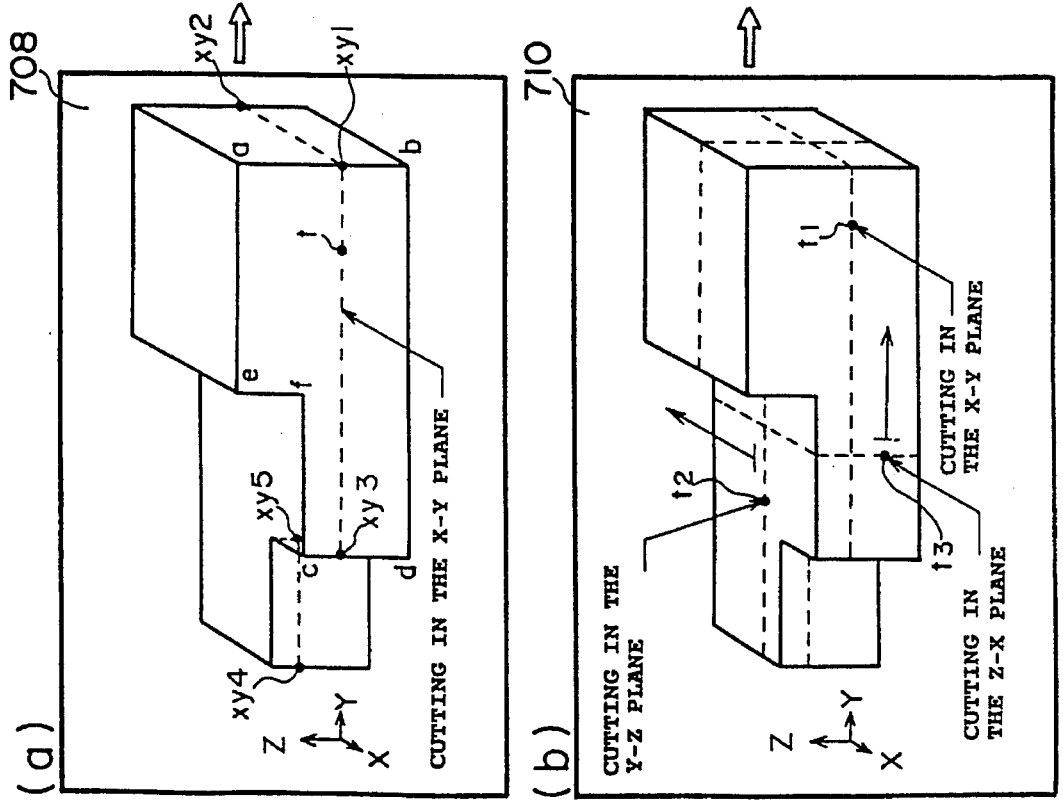

Next, let us explain the second method of specifying a cross-section. FIGS. 6A and 6B are of diagrams for explaining the second method specifying a cross-section.

In the second method, the cross-section on specified on a three-dimensional figure three-dimensional coordinates.

First, the three-dimensional figure that is the object of the processing is displayed rotated from an arbitrary point of view. The user specifies the point of view. By that specification, the movement/rotation coordinate conversion section 501 of the graphic control unit 6 performs rotation conversion processing of the figure data, and displays the data on the graphic display 505.

Let us suppose that a figure that is the object of processing is displayed from a similar point of view. Next, in this condition the user specifies the cutaway surface using the mouse 201.

In FIG. 6A, 708 shows a cut in the X-Y plane specified with the mouse 201. This cut specification is received; the cross-section shape processing unit 4 and the figure data editing unit 5 compute the cross-section shape and the intersection lines and perform the display/non-display processing, and then the graphic control unit 6 displays the processed data. A three-dimensional figure with the specified part on the X-Y plane cut away according to the cutting specification in 708 is displayed as in 709 in FIG. 6A.

Cross-sections can be specified not only on one surface but also on two or three surfaces. Specifically, in FIG. 6B 710, cross-section positions have been specified on three surfaces (the X-Y plane, the Y-Z plane and the Z-X plane) by the mouse 201. By doing this, as shown in FIG. 6B 711, the three-dimensional figure is displayed with the part forward of the specified Y-Z plane, the part below the specified X-Y plane and the part to the left of the specified Z-X plane cut away.

Figure 7:
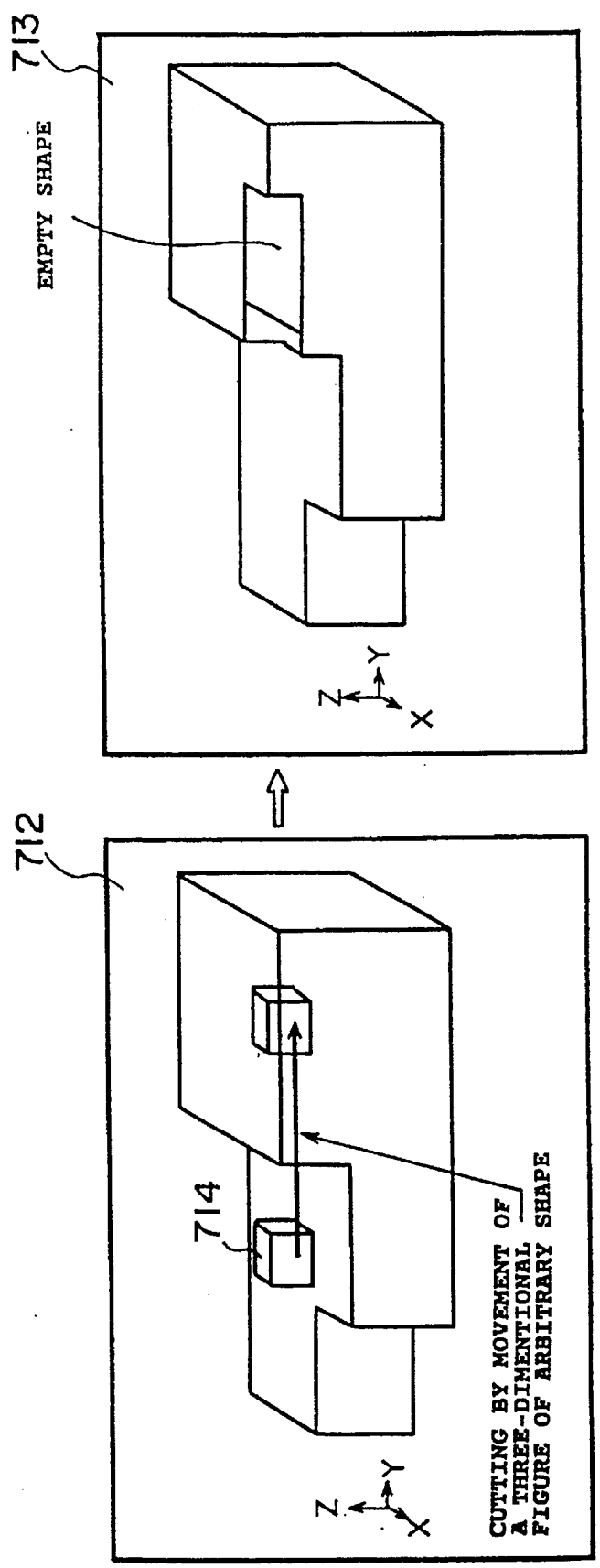
FIG. 7 is illustrating the third method of specifying a cross-section of the embodiment according to the present invention.

FIG. 7 is a diagram explaining the third method of specifying a cross-section.

In the third method of specifying a cross-section, the user specifies a second three-dimensional figure that is different from the three-dimensional figure that is the object of processing; then the user moves and rotates these three-dimensional figures using the mouse 201 to specify the cutaway surface where the two three-dimensional figures are superimposed.

In 712 of the same figure, one right-angled parallelepiped 714 is specified as the object to be cut; the user moves this to the right using the mouse 201. By moving the right-angled parallelepiped 714 to the right, the right-angled parallelepiped 714 is superimposed on the upper forward part of the original three-dimensional figure that is the object of the cross-sectional cutting.

The mouse control unit 3 detects the specifications of movement and rotation of the two three-dimensional figures from the mouse, and sends that information to the graphic control unit 6 and the cross-section shape processing unit 4; then the graphic control unit 6 successively displays those two three-dimensional figures. In addition, the cross-section shape processing unit 4 detects the superposition of the two three-dimensional figures, and finds the cross-section shape and intersection lines when the superimposed part is cut away. In addition, the figure data editing unit 5 judges whether the cross-sections and intersection lines are to be displayed or not displayed, and edits the data. When the two three-dimensional figures start to superimpose, the processing by the above-mentioned cross-section shape processing unit 4 and figure data editing unit 5 is executed, and the figure data after processing are sent to the graphic control unit 6 and displayed on the screen. By means of the above processing, as shown in 713 of the same figure the figure created when part of the three-dimensional figure that is the object of processing is cut away by the right-angled parallelepiped 714 is displayed.

The object that does the cutting is not limited to a right-angled parallelepiped such as 714 in the same figure. The user can specify an arbitrary three-dimensional figure.

Next, we explain the flow of processing in the above three cross-section specification methods.

Figure 8:
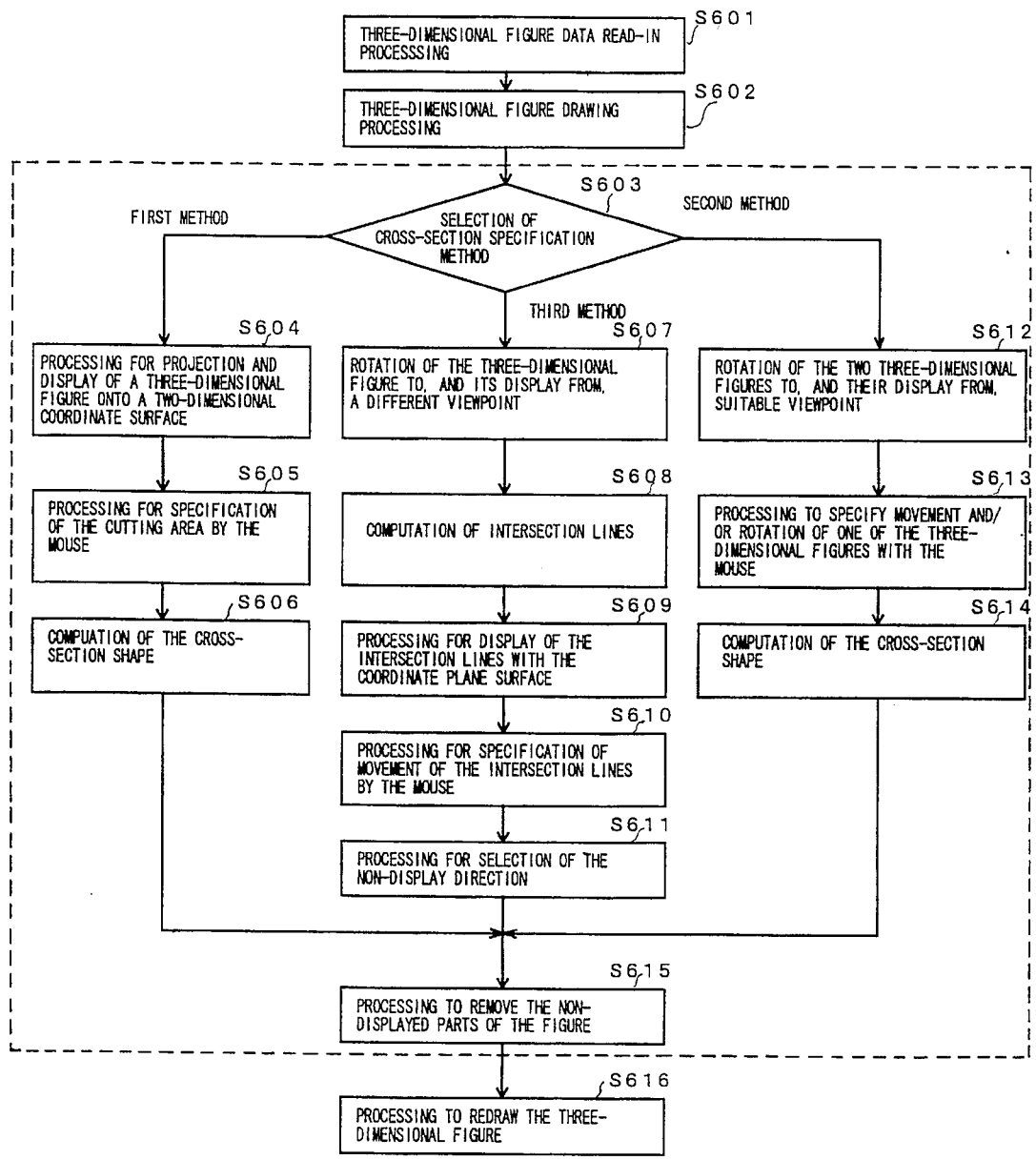
FIG. 8 is a flow chart of the process in an embodiment of this invention.

FIG. 8 is a flow chart of the operation in one embodiment of this invention.

First, when the user starts this system, the CPU 200 starts the figure data read-in processing unit 2. The figure data read-in section 102 of the figure data read-in processing unit 2 requests the user to select one of the three-dimensional figure data sets stored in the external storage device 101, reads in the selected three-dimensional figure data from the external memory device 101, and stores them in the figure data memory 103 (S601).

When the three-dimensional figure data are accumulated in the figure data memory 103, the CPU 200 starts the graphic control unit 6, and the display processing for the selected three-dimensional figure starts (S602). Specifically, the graphic control unit 6 reads in figure data from the figure data memory 103 through the CPU bus 250; after those figure data are converted one by one to position data on the display screen, the coloring/hidden surface processing section 502 performs coloring processing for each surface and processing of those surfaces that cannot be seen (hidden surface processing), then performs shading processing on the data and reads them into the frame memory 504. Data written into the frame memory 504 are displayed on the graphic display 505. This is the initial display of the three-dimensional figure.

In the initial display, all that happens is that the three-dimensional figure data stored in the figure data memory 103 are processed for display on the display, so the movement and rotation coordinate conversion section 501 and the intersection line display section 503 in the graphic display unit 6 are not started.

If the user wishes to change the viewpoint from that of this initial display, the new viewpoint is specified, for example by the mouse cursor. This starts the movement and rotation coordinate conversion section 501 of the graphic display unit 6, and coordinate conversion is performed, for example, a three-dimensional figure such as the one shown in FIG. 4 is displayed.

Next, the CPU 200 requests the user to select one of the three methods of specifying the cross-section explained above (S603). This selection is done, for example, from a menu displayed on the display.

If the first method, that is, the specification of the area to be cut away on a projection of the three-dimensional figure on arbitrary two-dimensional coordinates, is selected, the CPU first requests the user to select which two-dimensional coordinate surface the three-dimensional figure is to be projected onto. This selection, for example "X-Y plane, Y-Z plane, Z-X plane" is displayed on the screen and it is sufficient for the user to select one of the choices offered. It is also sufficient to use the mouse 201 to move the arrow to specify the viewpoint from which the three-dimensional figure is to be viewed.

Whichever selection is made, the movement and rotation coordinate conversion section of the graphic control unit 6 converts the figure data of the said three-dimensional figure projected onto one of the two-dimensional coordinate systems into coordinate data, stores the data in the frame memory 504, and displays them on the graphic display 505 (S604).

By this processing, for example the three-dimensional figure in FIG. 4 can be projected onto the Y-Z plane as shown in 702 of FIG. 5A or can be projected onto the X-Y plane as shown in FIG. 5B 704 and FIG. 5C 706.

Next, the CPU 200 directs the user to area to be cut away with the mouse 201. The user, in accordance with this instruction, uses the mouse 201 to specify the area to be cut away (S605).

If, for example, a rectangular area is specified as shown in FIG. 5A, the user moves the cursor to the upper left corner r1 of the rectangular area and clicks the mouse 201, then moves the cursor to the lower right corner r3 of the rectangular area and clicks the mouse 201 again. The mouse action detection section 202 of the mouse control unit 2 detects the above-described mouse action; then the mouse event processing section 203 recognizes from the series of actions that the rectangular area having the point r1 at its upper left corner and the point r3 at its lower right corner has been specified, and sends the rectangular area specification event, together with the coordinates of the two points r1 and r3, to the CPU 200.

In the case shown in FIG. 5B, the user, for example, moves the cursor to a vertex of the polygon (s1, s2, s3, s4, s5), and clicks the mouse 201. The mouse movement detection section 202 of the mouse control unit 3 detects this movement, and in addition the event processing section 203 sends the event of area specification by the polygon from the series of movements, together with the coordinates of the vertices, to the CPU 200.

In the case of specification of a circular area specification, as shown in FIG. 5C, the user, for example, moves the cursor to the center o1 of the circle and clicks the mouse 201, then moves the cursor to one point on the circular arc (for example the point o2) and clicks the mouse 201 again. The mouse movement detection section 202 of the mouse control unit 3 detects this movement, and in addition the mouse event processing section 203 recognizes from the series of movements that a circular area is being specified, computes the radius of the circle from the center o1 and the point o2 on the circular arc, and sends the event of area specification by a circle together with the coordinates of the center and the radius to the CPU 200.

The CPU 200 receives the event from the mouse event processing section 203, and starts the cross-section shape processing unit 4.

The cross-section shape processing unit 4 receives the event information created by the mouse processing section 203. The event information coordinate data are position coordinates on the graphic display 505, so these are converted to figure data coordinate values and then the cross-section shape is computed (S606).

Figure 9:
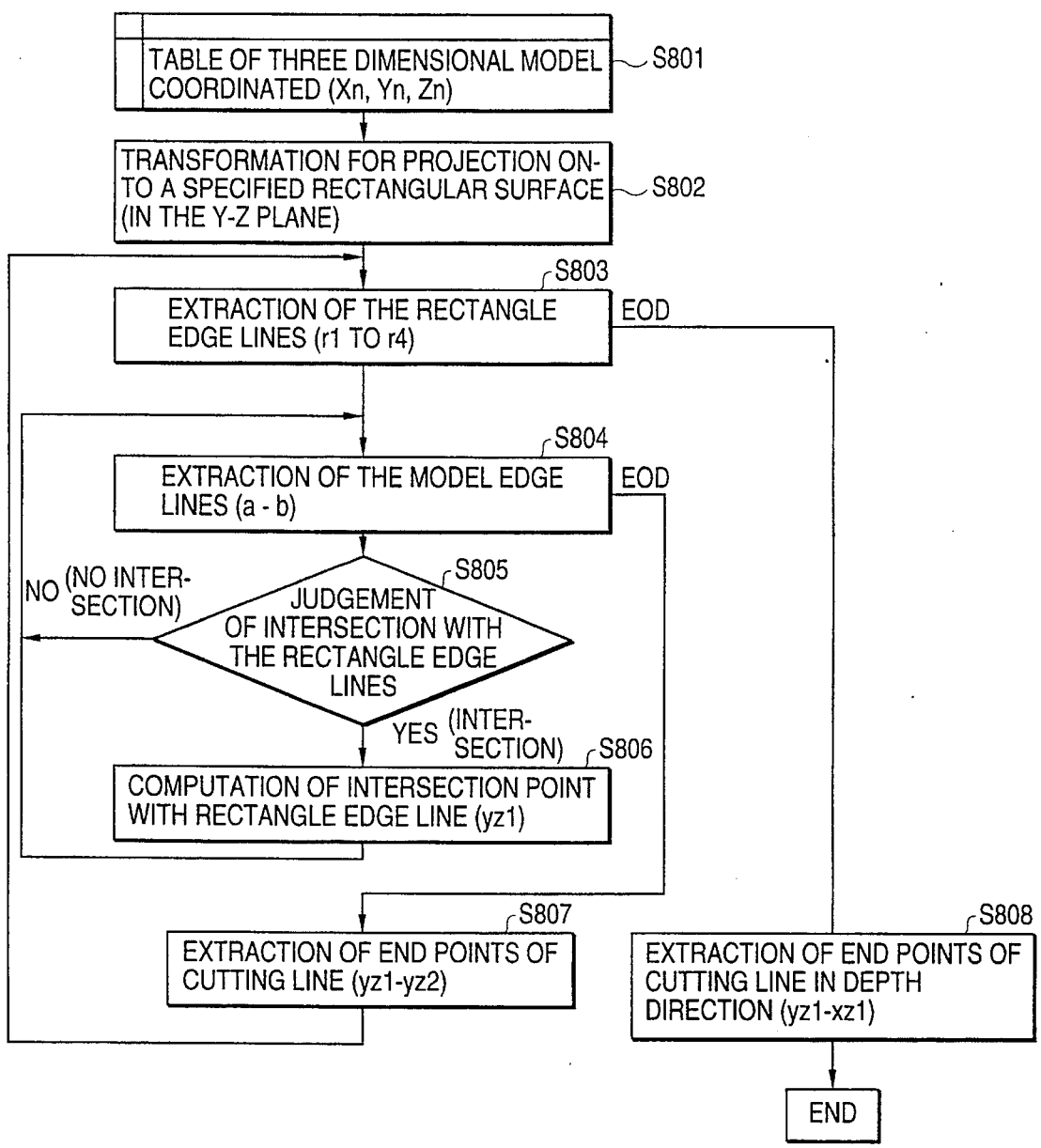
FIG. 9 is a flow chart showing a process of the cross-section shape processing unit of an embodiment according to the present invention and a method of specifying the cross-section by a rectangular area.

The details of the processing in the cross-section shape processing unit are explained for the example of a rectangular area as shown in FIG. 5A. FIG. 9 is a flow chart of the cross-section shape processing unit action for the rectangular cross-section in this embodiment.

First, the three-dimensional figure data that are the object of processing are read in to the cross-section shape processing unit 4 from the figure data memory 103 of the figure data read-in processing unit 2 (S801). The figure data consist of the coordinates of both ends of each side of each surface making up the three-dimensional figure. In this particular example the three-dimensional figure has nine sides; the figure data consist of the coordinates of both ends of each side of each of those surfaces. Specifically, for the surface enclosed by the six sides c-d-b-a-e-f-c in FIG. 5A, let us for example, the number of this surface one and the number of the side c-d 1. Then the coordinates of the two ends of this side c and d become figure data. Similarly, the coordinates of the ends e and f of the #2 side e-f of the #1 surface and the coordinates of the ends a and b of the #3 side a-b of the #1 surface are figure data. All together these are figure data of the three-dimensional figure.

Next, we perform coordinate conversion of these figure data to the two-dimensional coordinate surface already specified for the figure data (S802). For example, in this case we are projecting to the Y-Z surface, so the X coordinates of the figure data for each point are replaced by 0.

Here, the data that specify the cross-sectional surface of the rectangular area specified with the mouse 201 from the mouse event processing section 203 through the CPU bus 250 are input to the area judgment section 301 of the cross-section shape processing unit 4 under control of the CPU 200. The information that is input is the fact that the cross-section is a rectangle and the coordinates of the upper left and lower right corners of the rectangle. Since the coordinate values that are input are coordinates on the graphic display 505, the area judgment section 301 first converts these coordinate values to figure data in the two-dimensional coordinate system. This gives the coordinate values r1 and r3 in FIG. 5A.

From these coordinate values r1 and r3, one side of the rectangular area specified by the user as the cross-section surface (the rectangle line) is found (S803). Next, one edge line of the figure that is to be the object of cutting is extracted (S804), and whether or not the rectangle line extracted in S803 and the edge line extracted in S804 intersect is judged (S805). If they do intersect (yes) the coordinates of that intersection point are computed (S806). After the computation of the intersection, or immediately if the judgment in S805 is that the lines do not intersect (no), the flow returns to S804 and a different edge line is extracted (S804). The processing S804 to S806 is repeated for all of the edge lines. When the judgment of intersection with one rectangle line has been completed for all of the edge lines (EOD: end of data in S804), the intersection line computation section 302 finds the coordinates of the end points of the cutting line from the intersection points found in S806 (S807). Then another rectangle line is found (S803), and intersection judgments and cutting line extraction processing are performed for all of the edge lines (S803 to S807). This is repeated for all of the rectangle lines.

In the example in FIG. 5A, there are the rectangle lines r1-r2, r2-r3, r3-r4 and r4-r1; the edge lines of the figure that is the object of cutting are a-b, c-d, e-f, g-h, a-e, f-g and b-h. From the intersection judgments in S805, it is seen that the rectangle line r2-r3 intersects with the edge lines a-b, c-d and g-h; in S806 the respective intersection points were found as yz1, yz2 and yz3.

The above processing was done in a two-dimensional coordinate system (the Y-Z plane); when all of the intersection points have been found for the various combinations of rectangle lines and edge lines (EOD in S803), the intersection line computation section 302 finds the end of the cutting line on the three-dimensional coordinate (the X axis, which is the depth direction, in the example in FIG. 5A) (S808). Specifically, xz1 is found as the depth direction for yz1; similarly, the coordinates of the ends of the cutting lines are found for the depth directions for yz2 and yz3. The above explanation applies to the case of the rectangular area shown in FIG. 5A. The same kind of cutting lines can be found for the cases of cutting by a polygonal area, as shown in FIG. 5B, and cutting by a circular area, as shown in FIG. 5C. That is to say, the intersection points between all of the cutting area lines and all of the edge lines of the figure that is to be cut are found (S806); then, after the cutting lines are found on the two-dimensional coordinates (S807), the cutting lines on the three-dimensional coordinates are found (S808).

If, for example, cutting is to be done by the polygonal area in FIG. 5B, first the intersection points between the lines s1-s2, s2-s3, s3-s4, s4-s5, s5-s1 of the polygonal area s1-s2-s3-s4-s5-s1 and the edge lines of the figure to be cut are found. This gives the intersection points xy1 and xy2. Then the cutting lines on the three-dimensional coordinates are found.

If the cutting is to be done by the circular area shown in FIG. 5C, first the intersection points (xy3, xy4) between the edge lines of the figure to be cut and the circumference of the circular area are found; then the cutting lines on the three-dimensional coordinates including the Z axis are found.

By means of the above processing, processing to compute the cross-sectional surface by the cross-section shape processing unit 4 for the first cutting specification method is executed. Subsequent processing will be described below.

Next, returning to the action flow chart in FIG. 8, we explain the computation processing method for a cross-sectional area by the cross-section shape processing unit 4 by the second cutting specification method. This explanation will be given for the examples shown in FIG. 6A and FIG. 6B.

In the second method, in contrast to the first method, the user performs the cutting specification on the three-dimensional coordinates. Before performing the cutting specification, the user, using the mouse 201, specifies motion and/or rotation of the three-dimensional figure to make the cutting specification easier. When this specification is received, the movement/rotation coordinate conversion section 501 of the graphic control unit 6 performs the coordinate conversion and displays the figure (S607).

Next, the user performs the cutting specification for the three-dimensional figure that is displayed. Specifically, first the user selects with a menu whether the cutting will be done by the X-Y plane, the Y-Z plane or the Z-X plane. Then he moves the cursor to the position where the three-dimensional figure is to be cut, and clicks the mouse. For example, in the example shown in FIG. 6A, after the selection of the X-Y plane to do the cutting has been made on the menu, the cursor is moved to the point t on the three-dimensional figure and the mouse is clicked. This determines the cutaway surface.

Here, the CPU 200 sends the cutting plane (the X-Y plane) and the coordinates of the cursor position (t) at which the mouse was clicked to the cross-section shape processing unit 4. The cross-section shape processing unit 4 first converts the coordinates of the cursor position (t) to the coordinates of the three-dimensional figure data.

Next, the intersecting line computation section 302 computes the intersection lines for the specified cross-section surface (S608). Specifically, in the case shown in the same figure, the z coordinate of the point t is held fixed, and the coordinates of the intersecting lines for each surface of the three-dimensional figure are computed. From this, the ends of the intersecting lines, that is, for example xy1-xy2, xy1-xy3, xy4-xy5, etc. are found. The information on these ends of intersecting lines is sent to the graphic control unit 6, and the intersecting line display section 503 of the graphic control unit 6 displays the intersecting lines (S609).

In the case shown in FIG. 6B, three cross-section surfaces are specified by similar methods, and their intersecting lines are displayed by S608 and S609. Specifically, after cutting by the X-Y plane is selected from the menu the mouse is clicked at the point t1 to specify a cross-sectional surface in the X-Y plane; then cutting by the Y-Z plane is selected from the menu and the mouse is clicked at the point t2 to specify a cross-sectional surface in the Y-Z plane; then cutting in the Z-X plane is selected from the menu and the mouse is clicked at the point t3 to specify a cross-sectional surface in the Z-X plane.

In the second method, as explained above first the plane of the cross-sectional surface is specified, then the user can use the mouse to move the cross-sectional plane. Specifically, for example the mouse cursor is brought to an intersection line of the cross-sectional surface which it is desired to move; then the mouse button is pressed to latch onto the intersection line; then, with the mouse button held pressed down, the plane is moved to the desired position and then the mouse button is released. At this time, the mouse control unit 3 is coupled to the cross-section shape processing unit 4 and the graphic control unit 6, so that as the mouse moves the intersection line computation section 302 of the cross-section shape processing unit 4 computes the intersection lines and the graphic control unit 6 displays the lines on the graphic display (S610). As explained above, the user can move the intersection lines to determine the cross-sectional surface.

Next, the user selects which side of each intersection line to cut (which side not to display) (S611). Specifically, for example in the case shown in FIG. 6A, the user specifies that the upper side of the intersection lines is not to be displayed; in the case shown in FIG. 6B, the lower side of the cutting intersection lines in the X-Y plane, the forward side of the cutting intersection lines in the Y-Z plane, and the left side of the cutting intersection lines in the Z-X plane are specified by the user not to be displayed.

By means of the above processing, for the second cutting specification method the cutaway surfaces are determined by the cross-section shape processing unit 4 etc. The method of displaying the three-dimensional figure including the cutaway surfaces will be explained below.

Next, let us explain the method of cross-sectional surface computation processing by the cross-section shape processing unit 4 for the third cross-section specification method. The explanation will refer to the cross-section specification shown in FIG. 7 as an example.

First, either an arbitrary three-dimensional surface to be used for cutting is created, or data are read in from the three-dimensional figure data stored in the external storage device 101. The first three-dimensional figure will be cut by this second three-dimensional figure. In the example in FIG. 7, data for the right-angled parallelepiped 714 are either created or read in from the external memory device 101 and then displayed on the graphic display 505 by the graphic control unit 6.

The user specifies movement and/or rotation so that these two three-dimensional figures will be seen from a viewpoint that makes it easy to give the cutting instructions. The movement and rotation coordinate transformation section 501 of the graphic control unit 6 receives these instructions and displays the figures on the graphic display 505 (S612).

Next, one of the two three-dimensional figures is moved and the cutting instruction given. Specifically, in the example shown in FIG. 7, the right-angled parallelepiped 714, which is the second three-dimensional figure, is latched onto by the mouse and moved to the right. The mouse control unit 3 outputs the coordinates of the mouse cursor and the action of latching onto and moving the right-angled parallelepiped 714 as a mouse event. The movement and rotation coordinate transformation section 501 of the graphic control unit 6 performs movement processing following that movement and changes the display on the graphic display 505 accordingly (S613). The area judgment section 301 of the cross-section shape processing unit 4 receives the mouse event information, repeatedly judges whether or not the two moving three-dimensional figures are superimposed, and, if they are superimposed, the intersecting lines computation section 302 computes the intersecting lines of the two three-dimensional figures (S614). The user displays either the first or the second three-dimensional figure before moving either of the two three-dimensional figures, and specifies whether or not the second three-dimensional figure is to be not displayed.

By means of the above processing, the cross-section shape in the third cross-section specification method is computed.

When the cross-sectional surface is specified by the first, second or third method and the cross-section shape is computed, the display processing for this cross-section shape is executed (S615 and S616).

Figure 10A:
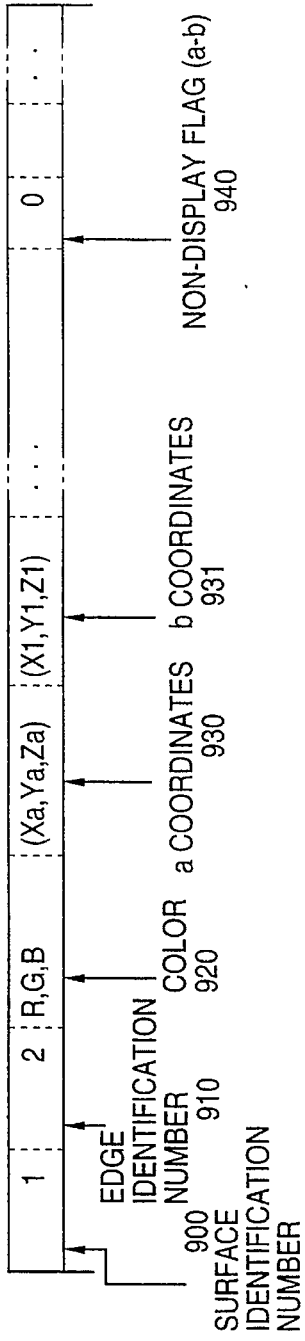
FIGS. 10A to 10C are diagram explaining the figure data of an embodiment according to the present invention.

Here, we will explain the cross-section shape display processing while simultaneously explaining the details of the figure data. FIGS. 10A, B, C are diagrams for explaining the figure data for one embodiment of this invention. The contents of the figure data will be explained using the figure data and cross-section specification (the second cross-section specification method) shown in FIG. 6A as examples.

FIG. 10A shows an example of the configuration of three-dimensional figure data read out from the external memory device 101 before the cross-section is specified. These data are displayed in units of figure surfaces; the information on each side of each surface takes the form of vector data (end point information).

The data consist of the identification numbers 900 of each surface making up the three-dimensional figure, the identification numbers 910 of the sides of each surface, the colors of each surface 920, the coordinates 930, 931 of both end points of each edge, and the non-display flags 940 indicating whether or not each edge is to be displayed. FIG. 10A shows the data for the edge a-b (edge identification number 2) of the surface (surface identification number 1) surrounded by the edges a-b-c-d-e-f of the three-dimensional figure shown in FIG. 6A. The coordinates (Xa, Ya, Za) 930 of the end point a and the coordinates (Xb, Yb, Zb) 931 of the end point b are the coordinates of both ends of this edge. In addition, the non-display flag 940 indicating whether the edge a-b is to be displayed or not is set to "0", indicating that the edge is to be displayed, as its initial value.

Figure 10B:
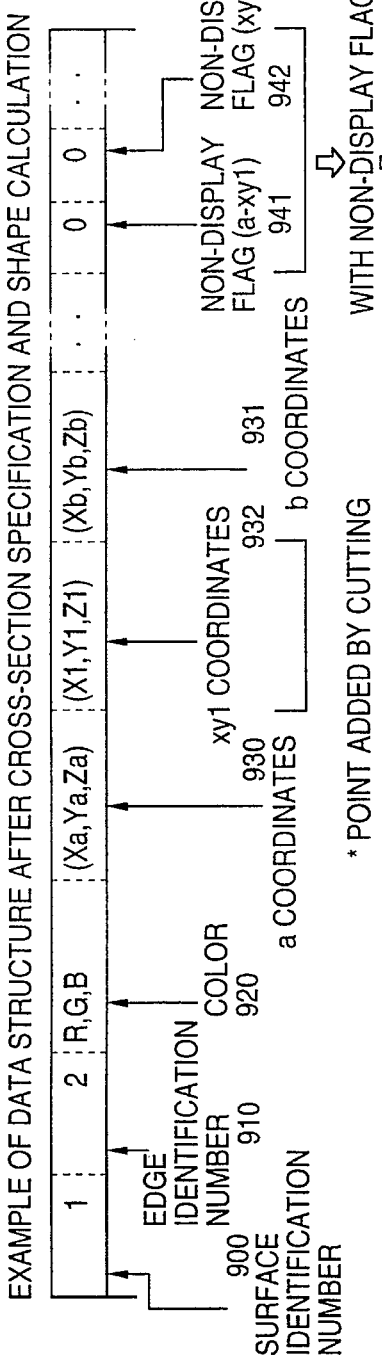

FIG. 10B shows an example of the data structure after the cross-section shown in FIG. 6A is specified and after the computation of the cross-section shape by the cross-section shape processing unit 4.

In this case, the intersection point xy1 is produced by cutting at an intermediate point along the edge a-b by the processing of the intersecting line processing section 302 of the cross-section shape processing unit 4 in step S608, so the coordinates (X1, Y1, Z1) of that intersection point xy1 are added between the coordinates 930 and 931 of the end points a and b. In addition, since the edge a-b is split into two line segments by the intersection point xy1, there are two non-display flags, the non-display flag 941 for the line segment a-xy1 and the non-display flag 942 for the line segment xy1-b. However, at this time the user has not yet selected whether it is to be the upper side or the lower side of the interesting lines in the cross-section specification that will not be displayed (specified for non-display), so both non-display flags 941 and 942 are "0", indicating that the entire edge a-b is to be displayed (S609).

At this time, as shown in the flow chart in FIG. 8, it is possible for the user to move the intersection lines in the cross-section specification (S610). Such movement changes the coordinates of the intersection point xy1, so each time movement occurs the coordinates 932 of xy1 in the data structure are rewritten.

In the second cross-section specification method (FIGS. 6A and 6B), at the stage at which the intersection lines in the cross-section specification are determined the user selects which parts of the three-dimensional figure divided up by the intersection lines are not to be displayed (S611).

After S611 in the case of the second cross-section specification method, or after the processing by the cross-section shape processing section 4 in the cases of the first and third cross-section specification methods (S606, S614), the figure data editing section 5 is started up, and non-display figure removal processing is executed (S615). In the cases of the first and third cross-section specification methods, it is predetermined that the parts of the figure within the limits (e.g. rectangular area) specified by the mouse or the parts where the figures overlap will be removed, so the step in which the user specifies which parts of the figures are not to be displayed is omitted. However, it should be understood that in either case the user can specify which areas are not to be displayed, just as in the case of the second cross-section specification method.

Figure 11:
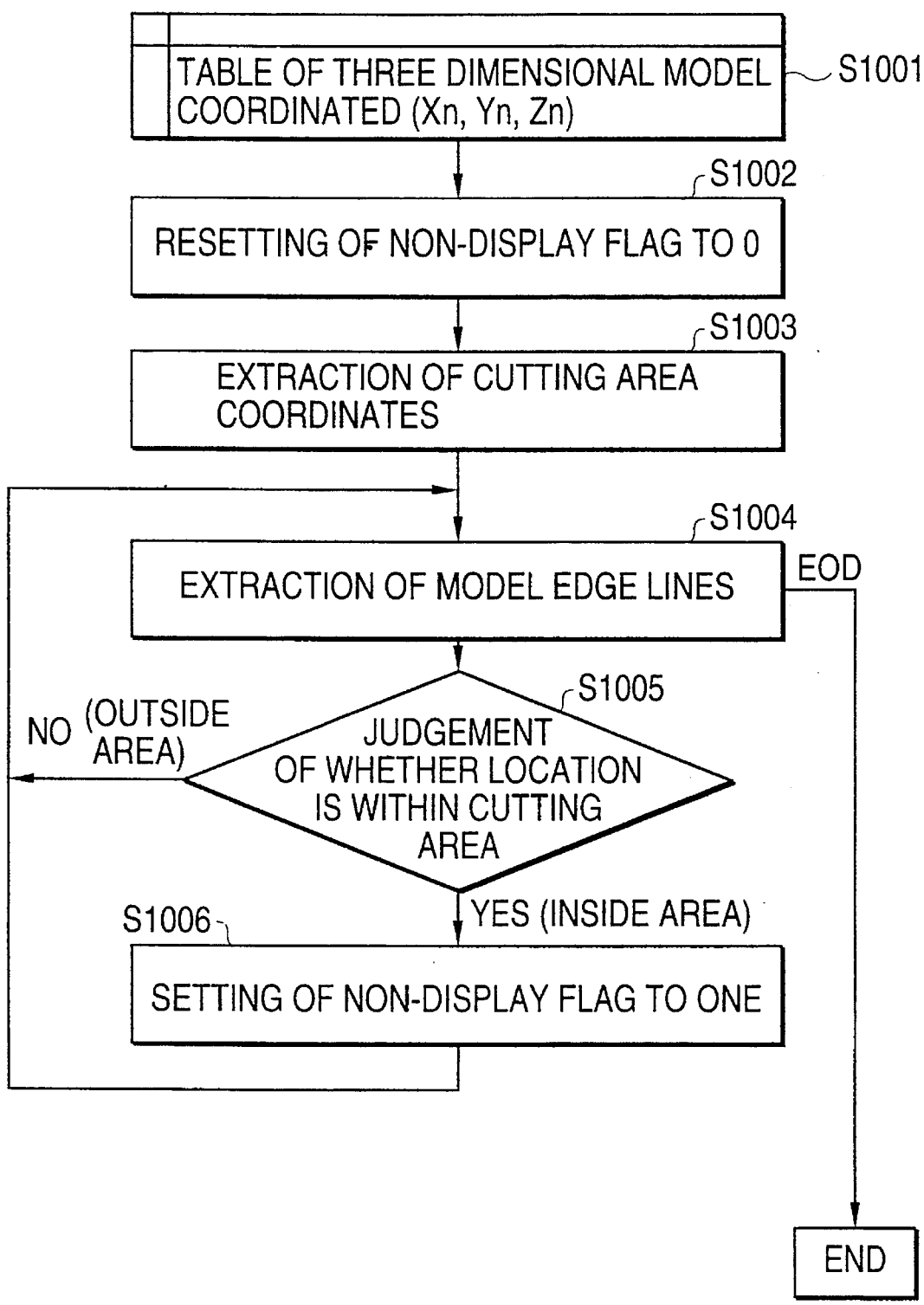
FIG. 11 is a flow chart showing a process of the figure data editing unit of an embodiment according to the present invention.

FIG. 11 is a flow chart of the operation in the figure data editing section 5 in one embodiment.

The figure data editing unit 5 first reads in the figure data to which the intersection point coordinates have been added from the figure data memory 103 in the figure data read-in processing unit 3 (S1001). Next, the non-display flags are reset to "0" for all of the figure data (S1002).

Then the non-display figure judgment section 402 is started up. The non-display figure judgment section 402 first extracts the cross-section area coordinates (S1003). Specifically, in the first cross-section specification method, in the case shown in FIG. 5A the fact that the cross-section area is the interior of the rectangular area enclosed by the lines joining the coordinates r1, r2, r3, r4 is extracted. Similarly, in the cases shown in FIG. 5B and FIG. 5C, the fact that the area in the interior of the polygon or circle is the cross-section area is extracted. In the case of the second cross-section specification method (FIGS., 6A, 6B), either of the two areas into which the larger area is split by the intersecting lines was selected to be the cross-section area by the user in S611. In the case of the third cross-section specification method, as shown in FIG. 7, the area in which the two three-dimensional figures overlap is the cross-section area. The coordinates of these respective cross-section areas are used by the system as data. It is possible to have the user select whether the overlapping area is to be displayed or not.

Next, the figure data are searched, and the coordinates of the end points of the line segments which make up the various edges in the figure data are extracted (S1004). Judgments are then made as to whether each line segment (each edge line) is located inside or outside of the cross-section area (S1005). If an edge line is outside of the cross-section area (judgment of NO), it means that the line segment is to be displayed, and the process returns to the extraction of the next line segment (the next edge line) in S1004. If, on the other hand, the judgment is that the line segment is inside the cross-section area (judgment of YES), then the non-display figure editing section 401 is started up, the non-display flag for the line segment is set to "1" (S1006), and the process returns to the extraction of the next line segment in step S1004. This processing (S1004 to S1006) is repeated for all of the line segments (all of the edge lines) in the figure data. When the area judgments and settings of the non-display flags are completed for all of the line segments (EOD in S1004), the processing by the figure data editing unit 5 is ended.

Figure 10C:
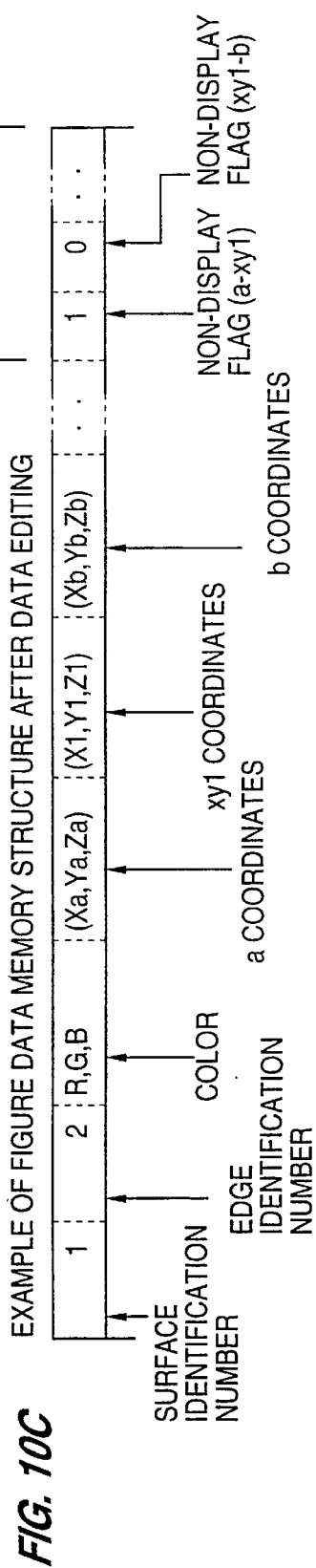

In, for example, the second cross-section specification method for the example shown in FIG. 6A, if the user makes the selection that the area above the intersection lines is not to be displayed, then the non-display flags for the intersection lines are set to "1" for the various figure data. In the figure data shown in FIGS. 10A, B, C, the non-display flag for the line segment a-xy1 has been set to "1", as shown in FIG. 10C. Meanwhile, the line segment xy1-b is to be displayed, so its non-display flag is set to "0".

Also, in the processing for the first cross-section specification method (S604 to S606) and the processing for the third cross-section specification method (S612 to S614), in the computation of the cross-section shape (S606 and S614) the intersection lines between the area specified as the cross-section and the three-dimensional figure that is the object of the processing are computed by the intersection line computation section 302, and figure data having a structure similar to those shown in FIGS. 10A to C are created. Then, after the coordinates of the cutting area are extracted in S1003, judgments are made as to whether each of the edge lines is inside the cross-section area or not (S1005), and the non-display flags are set (S1006), for all of the figure data.

The setting of the non-display flags is completed by the processing described above. Next, redrawing processing is performed for the three-dimensional figure including the cross-section by the graphic control unit 6 (S616 in FIG. 8).

Here we explain the operation of the graphic control unit 6, referring to FIGS. 12A to 13B. Since the drawing operation for three-dimensional figure data is very complicated, we focus attention on just one of the surfaces that make up the three-dimensional figure, and explain only the characteristic parts of that operation.

Figure 12A:
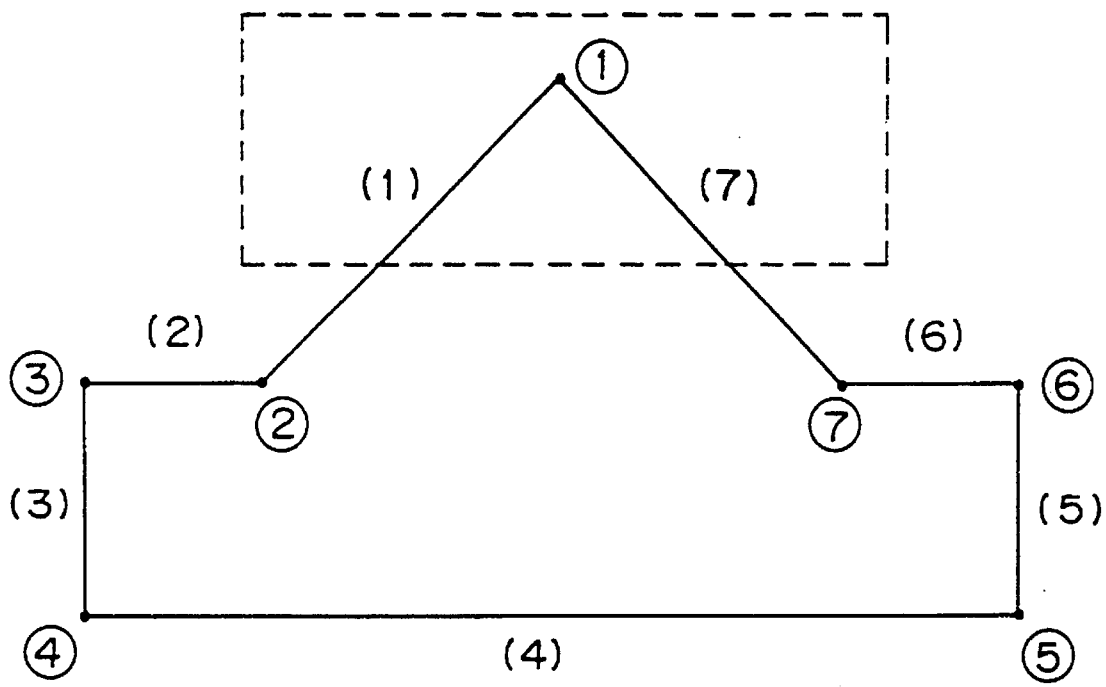
FIGS. 12A and 12B are figures showing one of the surfaces making up a three-dimensional figure to schematically explain the operation of the graphic control unit.
Figure 12B:
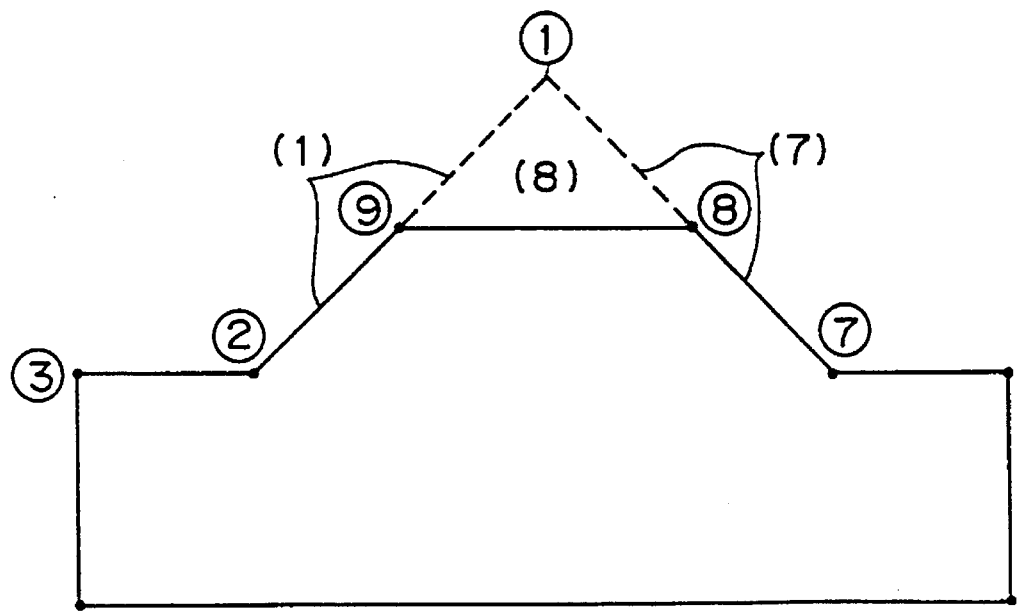

FIG. 12A shows the case in which the cross-sectional surface is specified in the figure using the first cross-section specification method. FIG. 12B shows the situation after the figure has been cut by the method shown in FIG. 12A. Numbers in parentheses are edge numbers; circled numbers indicate end point coordinate data.

The part enclosed by the dotted lines in FIG. 12A is the part specified not to be displayed by the first cross-section specification method. In the same figure, the edges (1) and (7) are intersection lines of non-displayed areas; the edge (1) is determined by the coordinate data ① and ②, and the edge (7) is determined by the coordinate data ⑦ and ①.

In FIG. 12B, the end point coordinate data ⑧ and ⑨ have been newly added, and the edge (8) created, by the cutting. This edge is created by the intersecting lines computation section 302 of the cross-section shape processing unit 4 discussed above. As a result, the coordinate data for the edge (1) now include the coordinate data ①, ⑨ and ②; and the coordinate data for the edge (7) now include the coordinate data ⑦, ⑧ and ①.

The intersecting lines computation section 302 of the cross-section shape processing unit 4 sets the non-display flags to "1" for the line segments from ① to ⑨ on edge (1) and ⑧ to ① on edge (7); the edge (8), with ⑧ and ⑨ as its end points, is added, and the figure data are stored in the figure data read-in processing unit 2.

FIG. 13A shows the data read in from the figure data memory 103 at the time when the figure formed by cutting by the graphic control unit 6 (the figure in FIG. 12B) is drawn. FIG. 13B shows the data among the data stored in the figure data memory 103 for the edges (1) and (7), which are cut and added with the new end points.

As can be seen by comparing FIG. 13A and FIG. 13B, the end point coordinates ①  and ⑦ are stored as data in the figure data memory 103, but the data for the end point ① and ⑦ coordinates are not included in the columns for the edges (1) and (7) in the data called by the Graphic control unit 6. Instead, the data for the edge (8) created by the cutting, consisting of the end point ⑧ and ⑨ coordinates, have been added.

After the processing by the movement and rotation coordinate transformation section 501, the coloring and hidden surface processing section 502 of the graphic control unit 6 colors the polygon circumscribed by the end point coordinates shown in FIG. 13A. Then the redrawing of the figure that has been cut is completed by drawing of the edge line (8) by the intersection lines display section 503.

Thus, in this invention, when a figure is drawn, the data for the parts that are not to be displayed after the cutting are not read in, so it should be easy to understand that the amount of data that are used for the drawing can be reduced.

Similarly, in the redrawing processing, first only the data for which the non-display flag is "0" are read into the graphic control unit 6 from the figure data memory 103. Since it is not necessary to read in data for which the non-display flag is "1", the drawing time is less than the time previously required for three-dimensional figure display. Then the necessary movement and rotation processing is performed by the movement and rotation coordinate transformation section 501; and coloring and shading are applied by the coloring and hidden surface processing section 502. Next, the intersection lines display section 503 is started up, and the intersection lines computation section 302 of the cross-section shape processing unit 4 writes in graphic data to the frame memory 504 so that the computed intersection lines will be added to the cross-section edge lines and displayed. Finally, the three-dimensional figure including the cross-section is redrawn by transferring the data in the frame memory 504 to the graphic display 505.

According to this invention, when a three-dimensional model assembled from two or more parts or two or more units made up of two or more parts is to be designed on a graphic display, it is possible to display a cross-section easily and efficiently, at an arbitrary location, and to specify an arbitrary shape for the cross-section.

In addition, after a cross-section has been specified, the amount of data can be reduced by eliminating the figure data for the part that is not to be displayed from the data used for drawing, so that the redrawing processing can be performed at high speed.

Furthermore, by specifying the cross-section by the method of superposition of two three-dimensional figures, the parts of the two figures that interfere with each other by contact can be displayed graphically, permitting investigation of such interference.

What is claimed is:

1. A three-dimensional model cross-section specification system having a CPU (central processor unit), external memory device, mouse and graphic display, for displaying three-dimensional figure data corresponding to a three-dimensional figure in a three-dimensional coordinate system with X, Y and Z axes on a graphic display, comprising:

figure data read-in processing means for reading in and storing three-dimensional figure data stored in said external memory device;

graphic control means for displaying the three-dimensional figure data stored in said figure data read-in processing means on a graphic display;

mouse control means for permitting a user to specify an arbitrary cross-section in, and to arbitrarily move and rotate, said three-dimensional figure displayed on the graphic display by said graphic control means using said mouse, and for creating information specified by the user;

cross-section shape processing means for computing the geometrical shape of a specified cross-section of said figure; and figure data editing means for distinguishing data that are not to be displayed as a consequence of the cutting from the three-dimensional figure data that are to be displayed so that only data to be displayed are read into said graphic control means;

thereby permitting specification and display of the cross-section of said figure located in an interior of a three-dimensional structure expressed by said three-dimensional model.

2. The three-dimensional model cross-section specification system according to claim 1, wherein said graphic control means displays data that have been designated as data to be displayed by said figure data editing means on the graphic display.

3. The three-dimensional model cross-section specification system according to claim 1, wherein said mouse control means permits the user to select any of the three mutually orthogonal two-dimensional coordinate planes, the X-Y plane, the Y-Z plane or the Z-X plane, said graphic control means projects and displays the three-dimensional figure data stored in said figure data read-in processing means on a two-dimensional plane surface selected by the user;

said mouse control means permits the user to specify an area of a figure projected and displayed on said two-dimensional plane surface to be cut:

said cross-section shape processing means finds an intersection line between said figure on said two-dimensional plane surface and a cutting area based on the cutting area specified by the user on said two-dimensional plane surface, and, at the same time, finds an intersection line that cuts said figure in a direction perpendicular to said two-dimensional plane surface, wherein the direction is Z direction in the case that said two-dimensional plane surface is a two-dimensional X-Y plane, X direction in the case that said two-dimensional plane surface is a Y-Z plane, or Y direction in the case that said two-dimensional plane surface is a Z-X plane, and a plane defined by said intersection lines are taken as a plane of the cross-section of said three-dimensional figure; and said figure data editing means designates a figure data on either an inside or an outside of a cutting surface specified by the user with the mouse control means as non-display data.

4. The three-dimensional model cross-section specification system according to claim 3, wherein said mouse control means permits a rectangular area that is to cut the projected and displayed figure to be specified by upper left and lower right corners using the mouse.

5. The three-dimensional model cross-section specification system according to claim 3, wherein said mouse control means permits a polygonal area that is to cut the projected and displayed figure to be specified using the mouse, by a plurality of arbitrary points which compose line segments joining to enclose said polygonal area.

6. The three-dimensional model cross-section specification system according to claim 3, wherein said mouse control means permits a circular area that is to cut the projected and displayed figure to be specified by the center and one other point using a mouse.

7. The three-dimensional model cross-section specification system according to claim 3, wherein said figure data editing means permits the user to select whether the data inside or outside of a cross-sectional surface will not be displayed.

8. The three-dimensional model cross-section specification system according to claim 1, wherein said mouse control means permits the user to select at least one of two-dimensional planes among the X-Y plane, the Y-Z plane and the Z-X plane in the XYZ coordinate system with respect to the three-dimensional figure displayed on the graphic display by said graphic control means, and permits the user to specify intersection lines between a selected two-dimensional plane surface and the three-dimensional figure; and said graphic control means specifies a cross-section by displaying the intersection lines on the three-dimensional figure in accordance with a user's specification sent from the mouse control means.

9. The three-dimensional model cross-section specification system according to claim 8, wherein said mouse control means selects and moves the intersection lines between the two-dimensional plane and the three-dimensional figure, and specifies rotation of the three-dimensional figure, and permits the user to specify the cross-section while checking the cross-section formed by the intersection lines by displaying the three-dimensional figure with rotation through an arbitrary angle under control of said graphic control means.

10. The three-dimensional model cross-section specification system according to claim 8, wherein said figure editing means permits the user to select either of a front or rear of the cross-section specified by the intersection lines between the two-dimensional plane and the three-dimensional figure that date of the three-dimensional figure are not to be displayed.

11. The three-dimensional model cross-section specification system according to claim 1, wherein said figure data read-in processing means can read in another set of three-dimensional figure data and store data in said figure data read-in processing means;

said graphic control means displays the two three-dimensional figures stored in said figure data read-in processing means on the graphic display;

said mouse control means permits the user to move and/or rotate the two three-dimensional figures, with taking parts of the two three-dimensional figures that overlap each other as a cross-sectional area; and said cross-section shape processing means detects superposition of the two three-dimensional figures, and computes shape of a cross-section formed as a contact surface on which the two three-dimensional figures are superimposed.

12. The three-dimensional model cross-section specification system according to claim 11, wherein said figure data editing means permits the user to select whether an overlapping parts of the two three-dimensional figures are not to be displayed, or only the overlapping parts are to be displayed.

13. A method of specifying a cross-section of a three-dimensional figure for use with a three-dimensional model cross-section specification system having a CPU (central processor unit), external memory device, mouse and graphic display, for displaying three-dimensional figure data corresponding to said three-dimensional figure in a three-dimensional coordinate system with X, Y and Z axes on a graphic display, comprising the steps of:

reading in and storing three-dimensional figure data stored in said external memory device;

displaying the three-dimensional figure data stored by said figure data read-in processing step on a graphic display;

permitting a user to specify an arbitrary cross-section in, and to arbitrarily move and rotate, said three-dimensional figure displayed on the graphic display by said display step using said mouse, and for creating information specified by the user;

computing the geometrical shape of a specified cross-section of said figure; and distinguishing data that are not to be displayed as a consequence of the cutting from the three-dimensional figure data that are to be displayed so that only data to be displayed are read by said display step;

thereby permitting specification and display of the cross-section of said figure located in an interior of a three-dimensional structure expressed by said three-dimensional model.

* * * * *